(No Model.)
H. A. KOBOLD.
TRUCK FOR BARRELS OR OTHER VESSELS.
No. 551,167. Patented Dec. 10, 1895.
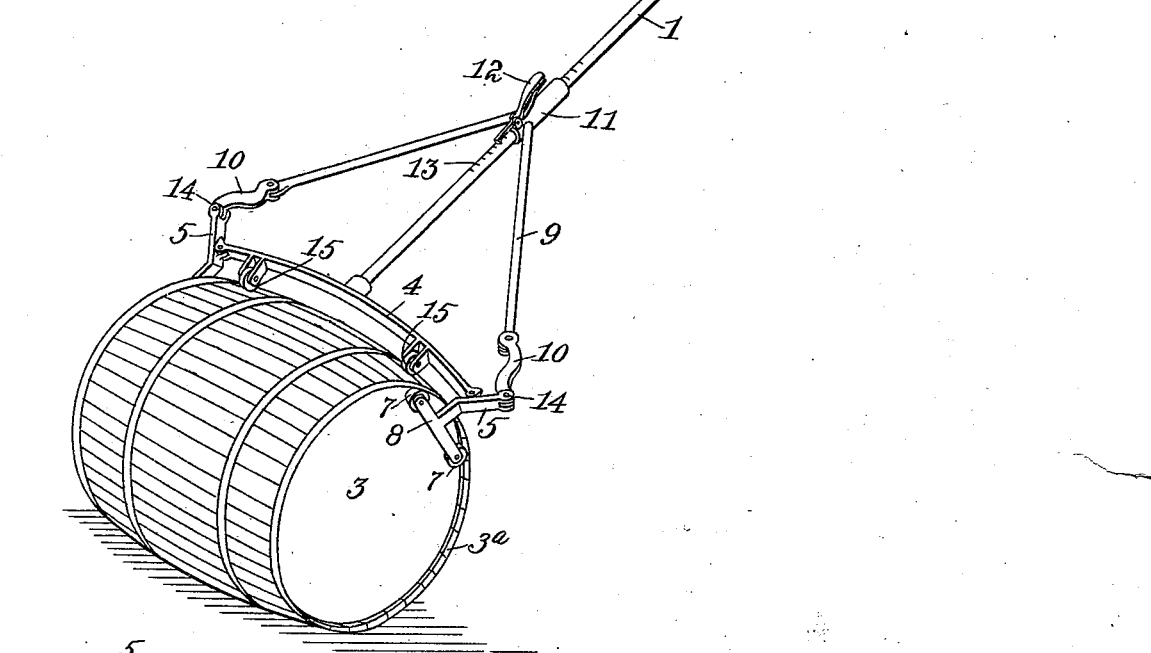
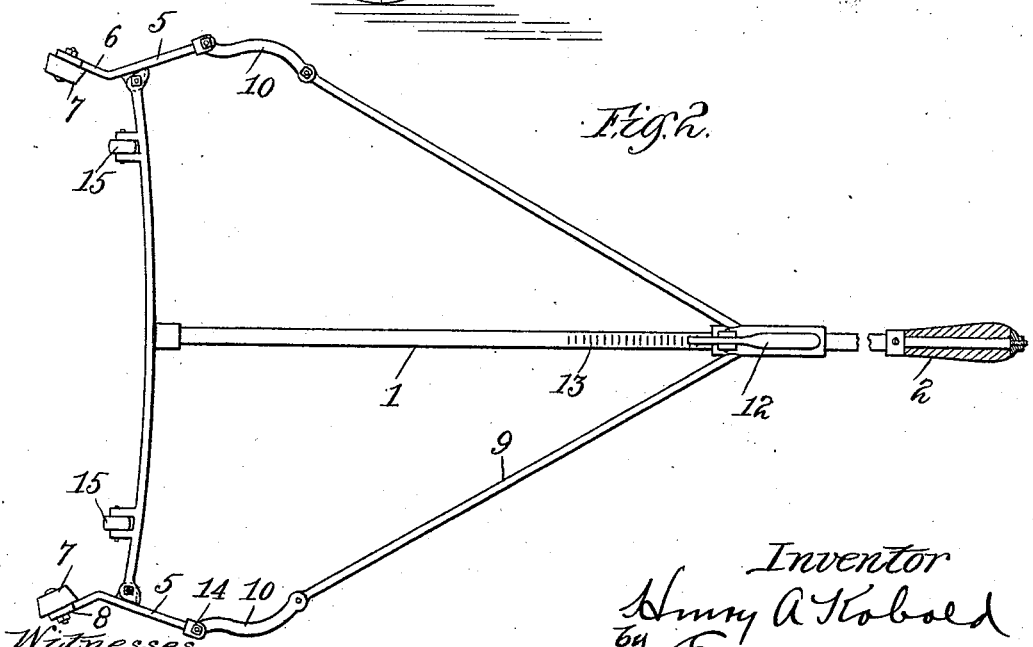

UNITED STATES PATENT OFFICE.

HENRY A. KOBOLD, OF CHICAGO, ILLINOIS.

TRUCK FOR BARRELS OR OTHER VESSELS.

SPECIFICATION forming part of Letters Patent No. 551,167, dated December 10, 1895.

Application filed April 19, 1895. Serial No. 546,400. (No model.)

*To all whom it may concern:*

Be it known that I, HENRY A. KOBOLD, a subject of the Queen of Great Britain, residing at Chicago, in the county of Cook and State of Illinois, have invented certain new and useful Improvements in Trucks for Barrels or other Like Vessels, of which the following is a full, clear, and exact specification.

My invention relates to a device for grasping kegs, barrels, casks, and other vessels having projecting flanges or rims at their ends like the chines of kegs and barrels, whereby the same may be conveniently and readily conveyed from place to place or raised and lowered along skids in loading and unloading without the necessity of touching the hands to them.

My invention has for its primary object to provide a device of this nature which will be capable of readily grasping the vessel in such a manner that the latter may be easily rolled and guided to the desired place, the cylindrical form of the vessel being utilized in giving it locomotion.

With these ends in view my invention consists in certain features of novelty in the construction, combination, and arrangement of parts by which the said object and certain other objects hereinafter appearing are attained, all as fully explained with reference to the accompanying drawings, and more particularly pointed out in the claims.

In the said drawings, Figure 1 is a perspective view of my improved apparatus, showing its application to a barrel or keg; and Fig. 2 is an enlarged plan view thereof.

In carrying out my invention I employ a handle 1, which may be of any desired length and which is provided at one end with a handhold 2, swiveled thereon, as shown in Fig. 2, so that the keg or barrel 3 will be at liberty to rock end for end without affecting the user's grasp upon the handle 1. This handle 1 is provided at its lower end with a cross-bar 4, rigidly secured thereto in any desired manner and adapted to extend longitudinally of the keg or barrel 3, as shown in Fig. 1. At each end of this cross-bar 4 is pivotally secured a lever 5, whose lower end 6 is bent outwardly, so as to project over the chine $3^a$ of the vessel, and such lower end is provided with one or more inwardly-projecting lugs, which engage with the inner side of the chine $3^a$. These lugs are preferably in the form of rollers 7, and are two in number, journaled one at each end of a cross-piece 8, and such lugs or rollers 7 are tapered inwardly, as shown more clearly in Fig. 2, so as to fit squarely against the beveled chine of the vessel. The advantage of the double lugs or rollers 7 is that the vessel in being pulled along will be held at two points instead of one, and consequently prevented from oscillating in an irregular manner. These pivoted levers 5 are caused to swing together at their lower ends, and thereby bring the rollers 7 under and in engagement with the chines $3^a$ by means of rods 9, which are pivotally connected at their lower ends to the upper ends of the levers 5 by means of short links 10, the upper ends of the rods 9 being rigidly secured to a sliding sleeve or collar 11, arranged on the handle 1. This sleeve or collar 11 carries a locking dog or pawl 12, adapted to engage with teeth or notches 13 in the handle 1, and thus lock the levers 5 in any desired position, and thereby prevent the rollers 7 from becoming accidentally disengaged with the chines. The disengagement of the rollers 7 is effected by pulling the sleeve or collar 11 upward on the handle 1, and their engagement with the chines of the vessel is effected by an opposite movement of such sleeve or collar. The length of the links 10 is so proportioned with reference to the rods 9 and levers 5 that the lower pivot 14, which connects the lower end of each link to each of the levers 5, will pass outward beyond the line of the rod 9, and consequently lock each of the levers 5 from being deflected outwardly at its lower end. In this manner the vessel will be held in the clutch of the device even in the absence of the locking-dog 12.

In order to hold the vessel more firmly and squarely in the clutch of the device, I provide the cross-bar 4 with antifriction-rollers 15, which are adapted to come against the periphery of the vessel when the parts are adjusted to their proper position.

Having thus described my invention, what I claim as new therein, and desire to secure by Letters Patent, is—

1. A device for the purpose described, having in combination a handle, a pair of levers pivotally connected to the handle and each of said levers having a plurality of inwardly projecting lugs for engagement with the chines of a vessel at different points, whereby rocking movement of the vessel will be prevented, substantially as set forth.

2. A device for the purpose described, having in combination a handle, a pair of levers pivotally connected to said handle and a number of inwardly projecting lugs on each of said levers for engaging with each of the chines of a vessel at different points, said handle being provided with means for pressing against the outside of the vessel, and said lugs being fixed against bodily movement with relation to the levers substantially as set forth.

3. A device for the purpose described, having in combination a handle, levers pivotally connected with said handle, a cross-piece on each of said levers and an anti-friction roller journaled on each end of said cross-piece, substantially as set forth.

4. A device for the purpose described, having in combination a handle, a cross-bar secured to said handle, levers pivoted to opposite ends of said cross-bar and each having two lugs arranged at a distance apart and being fixed with relation to the lever for engagement with the chines of a vessel, and means for locking said levers, substantially as set forth.

5. A device for the purpose described, having in combination a handle, a cross-bar secured to said handle, levers pivoted to the ends of said cross-bar and having lugs for engagement with the chines of a vessel, means for locking said levers, and anti-friction rollers secured to said cross-bar and adapted to engage with the periphery of the vessel, substantially as set forth.

6. A device for the purpose described, having in combination a handle, levers pivotally supported by said handle, a plurality of anti-friction rollers carried by each of said levers at their lower ends, and means for holding said levers in position, substantially as set forth.

HENRY A. KOBOLD.

Witnesses:
F. A. HOPKINS,
EDNA B. JOHNSON.